US010389946B2

(12) United States Patent
Hara (10) Patent No.: US 10,389,946 B2
(45) Date of Patent: *Aug. 20, 2019

(54) IMAGE DISPLAY DEVICE DISPLAYING PARTIAL AREAS AND POSITIONAL RELATIONSHIP THEREBETWEEN

(71) Applicant: NIKON CORPORATION, Tokyo (JP)

(72) Inventor: Shinya Hara, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/980,290

(22) Filed: May 15, 2018

(65) Prior Publication Data
US 2018/0262690 A1    Sep. 13, 2018

Related U.S. Application Data

(63) Continuation of application No. 15/248,519, filed on Aug. 26, 2016, now Pat. No. 10,015,404, which is a
(Continued)

(30) Foreign Application Priority Data

Feb. 26, 2014  (JP) ................................. 2014-035838

(51) Int. Cl.
 *H04N 5/232* (2006.01)
(52) U.S. Cl.
 CPC ..... *H04N 5/23293* (2013.01); *H04N 5/23245* (2013.01); *H04N 5/23296* (2013.01)
(58) Field of Classification Search
 None
 See application file for complete search history.

(56) References Cited

U.S. PATENT DOCUMENTS 7,460,782 B2  12/2008 Chan et al.
7,643,742 B2 *  1/2010 Watanabe ......... H04N 5/23212
                                                 348/240.2
(Continued)

FOREIGN PATENT DOCUMENTS

JP  2003-345340 A  12/2003
JP  2008-072261 A   3/2008
(Continued)

OTHER PUBLICATIONS

May 12, 2015 International Search Report issued in International Patent Application No. PCT/JP2015/055593.
(Continued)

*Primary Examiner* — Cynthia Segura
(74) *Attorney, Agent, or Firm* — Oliff PLC (57) ABSTRACT

For example, in an operation of determining a composition while zooming in a plurality of areas and confirming positional relationship of mutual images such as, for example, a case of horizontal leveling and the like performed when a construction is photographed, it has been necessary to perform a complicated operation of repeating designation and release of zoom-in areas among the plurality of the areas. Therefore, an imaging apparatus is provided, the imaging apparatus being provided with a display unit that displays an image, and a display control unit that zooms in and displays a plurality of partial areas within the image, and also displays on the display unit positional information representing positions of the plurality of partial areas within the image.

13 Claims, 9 Drawing Sheets

Related U.S. Application Data continuation of application No. PCT/JP2015/055593, filed on Feb. 26, 2015.

(56) References Cited

U.S. PATENT DOCUMENTS

| | | | |
|---|---|---|---|
| 7,711,258 B2 | 5/2010 | Yanagi | |
| 7,865,075 B2* | 1/2011 | Watanabe | H04N 5/23212 396/147 |
| 8,400,556 B2* | 3/2013 | Aoki | H04N 5/23293 348/240.2 |
| 8,675,089 B2 | 3/2014 | Tauchi | |
| 8,767,116 B2* | 7/2014 | Yamamoto | H04N 5/23212 348/333.03 |
| 9,736,370 B2 | 8/2017 | Barcovschi et al. | |
| 9,801,550 B2 | 10/2017 | Ferrantelli | |
| 10,015,404 B2* | 7/2018 | Hara | H04N 5/23293 |
| 2007/0098396 A1 | 5/2007 | Watanabe et al. | |
| 2008/0068487 A1 | 3/2008 | Morita | |
| 2008/0240563 A1 | 10/2008 | Takano et al. | |
| 2009/0009531 A1 | 1/2009 | Sudo et al. | |
| 2009/0009652 A1* | 1/2009 | Sudo | H04N 5/23293 348/349 |
| 2009/0153649 A1 | 6/2009 | Hirooka et al. | |
| 2010/0002071 A1 | 1/2010 | Ahiska | |
| 2010/0245630 A1 | 9/2010 | Kurokawa | |
| 2010/0329552 A1 | 12/2010 | Yim et al. | |
| 2011/0115933 A1 | 5/2011 | Yamazaki et al. | |
| 2011/0234881 A1 | 9/2011 | Wakabayashi et al. | |
| 2011/0242369 A1* | 10/2011 | Misawa | H04N 5/2258 348/240.2 |
| 2012/0050470 A1* | 3/2012 | Oba | H04N 5/225 348/43 |
| 2012/0165648 A1 | 6/2012 | Ferrantelli | |
| 2012/0229675 A1* | 9/2012 | Yamamoto | H04N 5/23212 348/231.99 |
| 2012/0268641 A1 | 10/2012 | Kazama | |
| 2013/0033615 A1* | 2/2013 | Ecrement | H04N 5/23293 348/222.1 |
| 2013/0088579 A1 | 4/2013 | Huh | |
| 2014/0168476 A1* | 6/2014 | Uemura | H04N 5/23296 348/240.1 |
| 2017/0118412 A1 | 4/2017 | Chung et al. | |

FOREIGN PATENT DOCUMENTS

| | | |
|---|---|---|
| JP | 2010-193049 A | 9/2010 |
| JP | 2012-186670 A | 9/2012 |
| JP | 2013-090241 A | 5/2013 |

OTHER PUBLICATIONS

Aug. 30, 2016 International Preliminary Report on Patentability issued in International Patent Application No. PCT/JP2015/055593.
Jun. 26, 2017 Office Action issued in U.S. Appl. No. 15/248,519.
Feb. 13, 2018 Notice of Allowance issued in U.S. Appl. No. 15/248,519.
Dec. 4, 2018 Office Action Issued in Japanese Patent Application No. 2016-505291.
Jun. 18, 2019 Office Action issued in Japanese Patent Application No. 2016-505291.

\* cited by examiner

IMAGE DISPLAY DEVICE DISPLAYING PARTIAL AREAS AND POSITIONAL RELATIONSHIP THEREBETWEEN

CROSS-REFERENCE TO RELATED APPLICATION(S)

This application is a continuation of U.S. application Ser. No. 15/248,519 filed Aug. 26, 2016, which is a continuation of International Application PCT/JP2015/055593, filed Feb. 26, 2015 and which is also based on and claims priority under 35 U.S.C. 119 from Japanese Patent Application No. 2014-035838 filed on Feb. 26, 2014. The contents of the above applications are incorporated herein by reference in their entireties.

BACKGROUND

1. Technical Field

The present invention relates to an imaging apparatus.

2. Related Art

An imaging apparatus which displays a live view image on a rear monitor, and for example, zooms in each face area of an object person has been known.
(Prior Art Documents)
Patent Document 1: Japanese Patent Application Publication No. 2012-186670

SUMMARY

For example, in an operation of determining a composition while zooming in a plurality of areas and confirming positional relationship of mutual images such as, for example, a case of horizontal leveling and the like performed when a construction is photographed, it has been necessary to perform a complicated operation of repeating designation and release of zoom-in areas among the plurality of the areas.

An imaging apparatus in one aspect of the present invention is provided with a display unit that displays an image, and a display control unit that zooms in and displays a plurality of partial areas within the image, and also displays, on the display unit, positional information representing positions of the plurality of the partial areas within the image.

The summary clause does not necessarily describe all necessary features of the embodiments of the present invention. The present invention may also be a sub-combination of the features described above.

DESCRIPTION OF EXEMPLARY EMBODIMENTS

Hereinafter, embodiments of the present invention will be described. The embodiments do not limit the invention according to the claims, and all the combinations of the features described in the embodiments are not necessarily essential to means provided by aspects of the invention.

Figure 1:
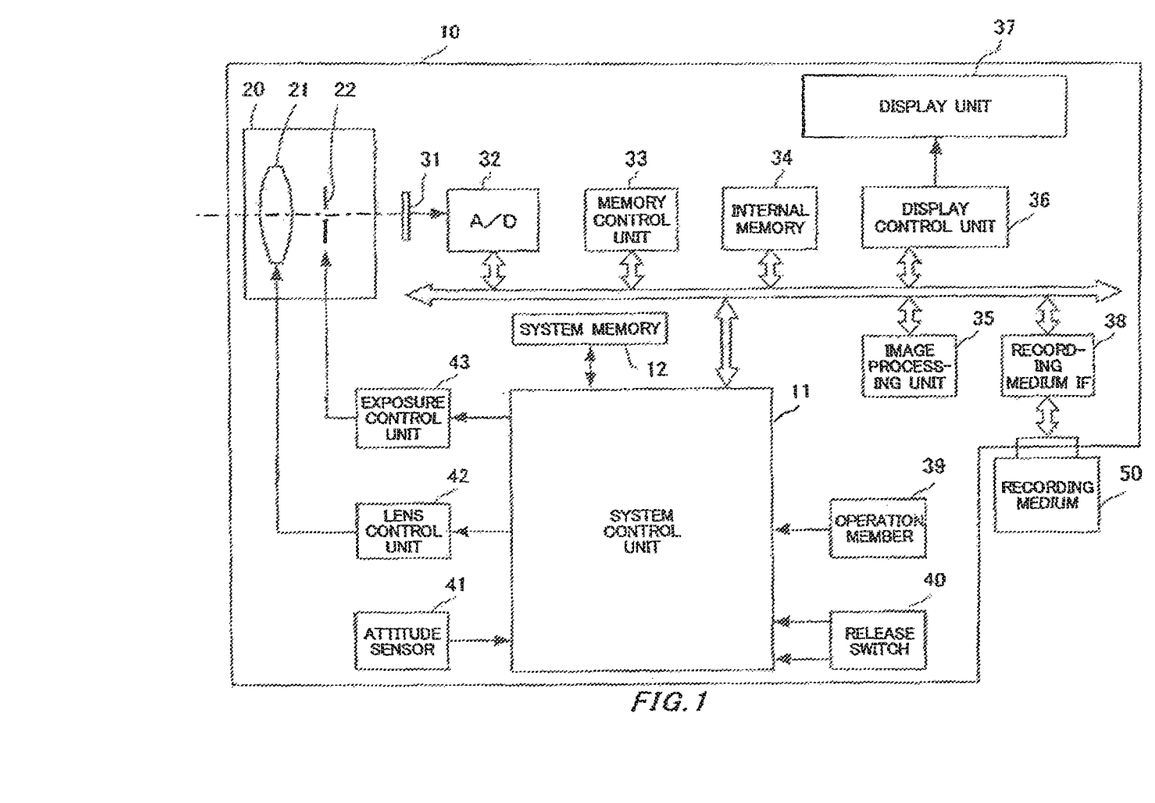
FIG. 1 is a view of a system configuration of a camera according to an embodiment.

FIG. 1 is a system configuration view of a camera 10 according to the present embodiment. The camera 10 is provided with a system control unit 11 which directly or indirectly controls each element that constitutes the camera 10. The system control unit 11 communicates with a system memory 12. The system memory 12 is electrically removable and recordable non-volatile memory which is constituted by flash memory, for example. The system memory 12 records a constant, a variable, a set value, a program, and the like which are necessary when the camera 10 is operated in order to prevent them from being lost even when the camera 10 is not operated.

The camera 10 is provided with an optical system 20. The optical system 20 is constituted by a lens group 21 primarily including a zoom lens, a focus lens, and a hand shake compensation lens, and an aperture 22. An object image is incident on the optical system 20 along an optical axis to form an image on an image plane of an imaging element 31.

The imaging element 31 is an element which photoelectrically converts an optical image which is the object image entering through the optical system 20, and a CCD or CMOS sensor is used, for example. The object image photoelectrically converted by the imaging element 31 is converted from an analog signal to a digital signal by an A/D converter 32.

The object image converted to the digital signal is sequentially processed as image data. The image data converted to the digital signal by the A/D converter 32 is once stored in an internal memory 34 according to control by a memory control unit 33. The internal memory 34 is random access memory capable of high speed reading and writing, and DRAM, SRAM, and the like are used, for example. The internal memory 34 serves as a buffer memory at which data image to be processed waits for its turn of image processing in a case where plural pieces of image data are serially generated at high speed in continuous shooting and moving image shooting. Also, the internal memory 34 also serves as work memory in image processing and compression processing performed by an image processing unit 35, and also serves to temporarily store the processed image data. Furthermore, the constant, the variable, the set value, the program, and the like which are recorded in the system memory 12 are appropriately developed, and used for control of the camera 10. Therefore, the internal memory 34 is provided with sufficient memory capacity that suits for serving these roles. The memory control unit 33 controls how much memory capacity is allocated to what operation.

The image processing unit 35 converts the image data into an image file conformable to a predetermined image format based on a shooting mode being set and instructions from a user. For example, in a case where a JPEG file is generated as a still image, after image processing such as color conversion processing, gamma processing, white balance processing, and the like is performed, the image data is subjected to adaptive discrete cosine transform and the like, and then compression processing is performed thereon. Also, in a case where an MPEG file is generated as a moving image, a frame image as continuous still images generated by reducing pixels to a predetermined pixel count is subjected to an intra-frame coding and an inter-frame coding, and then compression processing is performed thereon.

The still image file and the moving image file processed by the image processing unit 35 are recorded in recording medium 50 from the internal memory 34 via recording medium IF 38 by control of the memory control unit 33. The recording medium 50 is non-volatile memory attachable to and detachable from the camera 10, and is constituted by the flash memory, and the like. However, the recording medium 50 is not limited to an attachable and detachable type, and it may be a recording medium built into the camera 10 such as SSD and the like, for example. At this time, the still image file and the moving image file recorded in the recording medium 50 are output to the outside by a wired USB, a wireless LAN, and the like.

The image data processed by the image processing unit 35 generates image data for display in parallel with image data to be processed for recording. Regular image data for display is image data with a lower pixel count in which the image data to be processed for recording is copied and then subjected to thin-out processing. The thus generated image data for display is converted to an RGB signal by the display control unit 36, and is output to a display unit 37.

The display unit 37 is a liquid crystal display, for example. The display unit 37 receives the RGB signal output by the display control unit 36, and displays the image data for display so as to be visually recognizable by the user. Regardless of the presence or absence of record, if the image processing unit 35 generates a live view image data for sequential display and outputs it to the display unit 37 according to an output of the imaging element 31, the display unit 37 serves as an electronic viewfinder which displays the live view image. Therefore, the display unit 37 can realize reproduction display after still image shooting and moving image shooting, and live view display before shooting and during moving image shooting.

The display control unit 36 can also individually display on the display unit 37 information associated with the image data to be displayed and a menu screen or the like recorded in the system memory 12, and the like, or can also display them by being superimposed on the live view image and the reproduction image.

The camera 10 is provided with a plurality of operation members 39 that accepts an operation from the user. The system control unit 11 senses that these operation members 39 are operated, and performs an operation in response to the operation. Also, the camera 10 is provided with a release switch 40 as a type of the operation members 39. The release switch 40 is constituted with a press button capable of sensing in two steps in a push-down direction, and the system control unit 11 performs AF, AE, and the like which are shooting preparation operations by sensing of SW1 which is a first-step push-down, and performs an operation of acquiring the object image by the imaging element 31 by sensing of SW2 which is a second-step push-down.

An attitude sensor 41 is, for example, an acceleration sensor, and detects an attitude of the camera 10. The attitude sensor 41 can at least differentiate a horizontal angle of view in which a lateral direction and a gravitational direction of the imaging element 31 are parallel to each other and a vertical angle of view in which a longitudinal direction and the gravitational direction of the imaging element 31 are parallel to each other. With the use of a sensor with further higher accuracy, it is also possible to realize an electric level by displaying on the display unit 37 output results of the attitude sensor 41 as a horizontal line, for example.

A zoom lens, a focus lens, and a hand shake compensation lens are controlled by a lens control unit 42 to change an angle of view of the object image, focus a specific area of the object image on a light receiving surface of the imaging element 31, eliminate hand shaking, and maintain stable in-focus state of the imaging element 31 on the light receiving surface. The aperture 22 is controlled by an exposure control unit 43 to realize a set aperture opening.

Figure 2:
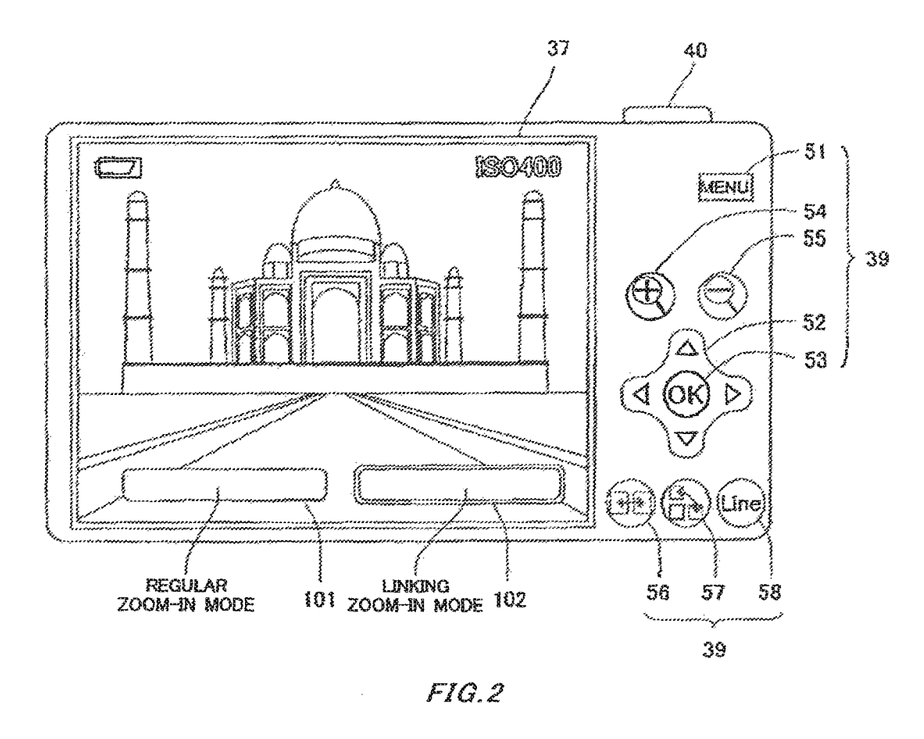
FIG. 2 is a back view of the camera displaying a zoom-in mode selection menu.

FIG. 2 is a back view of the camera 10 that displays a zoom-in mode selection menu. Besides the display unit 37, a menu button 51, a cross key 52, a confirmation button 53, a zoom-in button 54, a zoom-out button 55, an active window switch button 56, a window arrangement switch button 57, and a line movement selection button 58 as the operation members 39 are arranged on the back of the camera 10.

The menu button 51 is used for calling and displaying a menu screen. The cross key 52 is a direction switch capable of push-down in horizontal and vertical directions, and it is used for selecting one item among a plurality of displayed items, and moving the displayed object element within the screen. The confirmation button 53 is used for confirming the selected item.

The zoom-in button 54 is used for zooming in at least a part of the image being displayed. The zoom-out button 55 is used for zooming out at least a part of the image being displayed.

The active window switch button 56 is used for switching between the active window and the inactive window in a linking zoom-in mode which will be described later. The window arrangement switch button 57 is used for switching the arrangement of the inactive window with respect to the active window in the linking zoom-in mode, similarly. The line movement selection button 58 is used in a case where a main line displayed within the active window is moved in the linking zoom-in mode, similarly. Specific functions of these buttons will be discussed in detail later.

In addition, these operation members 39 may be set so as to not only express a single function, but also express different functions for each of the shooting mode and a reproduction mode, for example. Also, the operation members are not limited thereto, and other operation members may be provided. Also, an aspect of the operation members is not limited to a type of buttons, but may also be other operation members such as a touch panel superimposed on the display unit 37.

In the drawing, selection buttons related to the zoom-in mode are displayed on the display unit 37 along with the live view image. The user can call the display by operating the menu button 51. The selection buttons are composed of the regular zoom-in mode icon 101 and the linking zoom-in mode icon 102, and the user can activate any one of these icons by operating the cross key 52 in a horizontal direction. For example, an active button like the linking zoom-in mode icon 102 in the drawing is displayed with a frame surrounding therearound. The user can confirm the selection of the active button upon operating the confirmation button 53.

The zoom-in mode includes two modes of the regular zoom-in mode and the linking zoom-in mode, and the user selects any one of these modes in a case where the user wishes to zoom in the live view image. The regular zoom-in mode is a mode which sequentially zooms in and displays the entire image each time the user presses the zoom-in button 54, taking the center of the live view image as a reference position, for example. The user presses the zoom-out button 55 to zoom out the entire image in a case where the user zoomed in the image too much, and a case where the user wishes to get the image back to the original. Also, the user can operate the cross key 52 to move the reference position of the zoom-in image vertically and horizontally.

Figure 3:
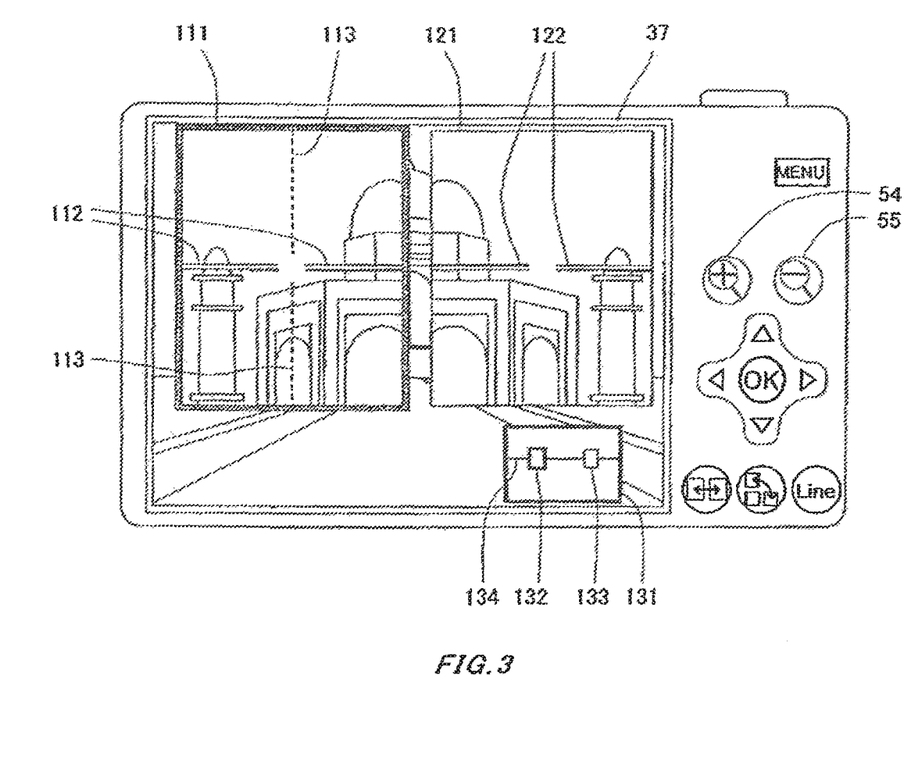
FIG. 3 is a back view of the camera displaying zoom-in windows by a linking zoom-in mode.

The linking zoom-in mode is a mode provided with zoom-in windows corresponding to two areas of the live view image to zoom in and displays the image in synchronization with each area. FIG. 3 is a back view of the camera 10 displaying the zoom-in window by the linking zoom-in mode.

When the user selects the linking zoom-in mode, the display control unit 36 displays two zoom-in windows on the display unit 37 as illustrated. One is an active window 111, and the other is an inactive window 121. The active window 111 is a zoom-in window to be the object for which the user primarily operates the operation member 39 to perform adjustment. The inactive window 121 is a zoom-in window in which the display image is zoomed in in synchronization with the active window 111 and positional information indicating the relative positional relationship with the active window 111 is displayed. In the drawing, the active window 111 and the inactive window 121 are superimposed and displayed on the live view image.

The display control unit 36 superimposes the live view image near the lower right-hand side of the display unit 37 to display a navigation window 131. The navigation window 131 indicates that the active window 111 and the inactive window 121 each zoom in and display any area of the live view image. Specifically, the entire area of the navigation window 131 represents a whole angle of view of the live view image, and the areas displayed on the zoom-in windows are indicated by two indicators according to the relative positions and sizes of the areas. Out of two indicators, an active indicator 132 corresponds to the active window 111, and an inactive indicator 133 corresponds to the inactive window 121.

In the present embodiment, the zoom-in area of the active window 111 and the zoom-in area of the inactive window 121 are set so as to be mutually horizontal areas or vertical areas with respect to the entire angle of view. The drawing indicates a case where the zoom-in areas are set as horizontal areas. A horizontal line 134 represents a line connecting the centers of both zoom-in windows for a case where the zoom-in areas are set to be as mutually horizontal areas.

In addition, in the present embodiment, the imaging element 31 is a rectangular shape having an active pixel region in a ratio of 3:2, and a case in which the user holds the camera 10 at a horizontal angle of view such that the lateral direction of the imaging element 31 is in parallel with the gravitational direction is taken as a positive attitude. The longitudinal direction and the lateral direction of the imaging element 31 in this positive attitude are taken as a horizontal direction and a vertical direction, respectively. Therefore, in a case where the user holds the camera 10 at a vertical angle of view such that the longitudinal direction of the imaging element 31 is in parallel with the gravitational direction, the lateral direction and the longitudinal direction of the imaging element 31 become the horizontal direction and the vertical direction, respectively.

The active window 111 and the inactive window 121 zoom in and display the areas corresponding thereto at the same enlargement ratio. For example, an initial enlargement ratio is set to be 2.0 times, and after that, each time the user operates the zoom-in button 54, the display control unit 36 updates the enlargement ratios of both zoom-in windows with 0.5 times increment such as 2.5 times and 3.0 times to zoom in and display the image. Similarly, each time the user operates the zoom-out button 55, the display control unit 36 updates the enlargement ratios of both zoom-in windows with 0.5 times decrement such as 3.0 times and 2.5 times to zoom out and display the image.

In addition, it has been described above that the image data for display is image data with a lower pixel count in which the image data to be processed for recording is processed by thin-out processing. However, in a case where zoom-in at the enlargement ratio beyond the predetermined enlargement ratio (for example, 10.0 times) is instructed, the display control unit 36 may perform display processing with the use of fine image data in which thin-out processing is not performed. In this case, the system control unit 11 may control the image processing unit 35 so as to generate fine image data only in areas corresponding to the zoom-in areas.

The display control unit 36 superimposes a main line 112 on the zoom-in image displayed on the active window 111. The main line 112 is a horizontal line passing through the center of the active window 111 as an initial state in a case where two zoom-in areas are mutually set as horizontal areas. The display control unit 36 superimposes a main line 122 on the zoom-in image displayed on the inactive window 121 in synchronization with the main line 112.

In a case where the display control unit 36 generates the main line 112 in the active window 111 as a line corresponding to the x-th row horizontal pixel from the top in the active pixel of the imaging element 31, the display control unit 36 also generates the main line 122 in the inactive window 121 as the line corresponding to the x-th row horizontal pixel. That is, the main line 112 and the main line 122 are generated so as to match the image formed by a pixel signal output from the pixel positioned on the same row of the imaging element 31. In the present embodiment, since two zoom-in areas are set as areas matching each other in the horizontal direction with respect to the entire angle of view, the main line 122 appears as the horizontal line passing through the center of the inactive window 121 as an initial state.

The display control unit 36 superimposes a subline 113 on the zoom-in image displayed on the active window 111. The subline 113 is a vertical line passing through the center of the active window 111 as an initial state in a case where two zoom-in areas are mutually set as horizontal areas.

The main line 112, the main line 122, and the subline 113 are cut out in the center area of each zoom-in window on which these lines are superimposed and displayed. That is, each line is not superimposed on the center area of each zoom-in window. Also, as will be described later, in a case where the main line 112 is moved, the cut-out area moves from the center area along with the movement.

The significance of displaying the active window 111 and the inactive window 121 side by side will now be described.

For example, in a case where the construction as illustrated in FIG. 2 and FIG. 3 is photographed, the user may wish to exactly match a horizontal line and a vertical line of the construction in a horizontal direction and a vertical direction of the photographed image. At this time, if the user attempts to determine the angle of view at the regular zoom-in mode, the user would, for example, zoom in one end of a horizontal portion of the construction once to confirm the angle of view, zoom in the other end portion by moving the zoom-in reference position in the horizontal direction to confirm the angle of view, and if there is deviation for the image, then the user would adjust the inclination of tripod, and zoom in one end again to confirm the angle of view. That is, since the user would operate the camera during the adjustment of the angle of view in addition to the need of complicated operation, it would be difficult to resolve the deviation of the inclination.

Meanwhile, if two zoom-in windows are prepared, and positional information like a horizontal line, for example, representing the positional relationship between mutual zoom-in areas is superimposed, then the user can easily exactly match the horizontal direction and the vertical direction of the photographed image with the horizontal line and the vertical line of the construction. For example, if each zoom-in window simultaneously zooms in and displays one end and the other end of the horizontal portion of the construction, and superimposes the horizontal line representing the same pixel line, then it is possible to confirm at a glance whether or not horizontal leveling is completed. Since the images displayed on the zoom-in windows are a part of the live view image, even in a case where the horizontal line of the construction and the horizontal direction of the photographed image have deviation, the user can resolve the deviation only by adjusting the tripod while confirming the zoom-in display.

Two portions of the object image to be the target on which the horizontal leveling or vertical leveling is performed do not necessarily match the initial area defined by the system control unit 11. Therefore, the system control unit 11 accepts designation of the image area to be zoomed in and displayed on each zoom-in window via the user operation.

Figure 4:
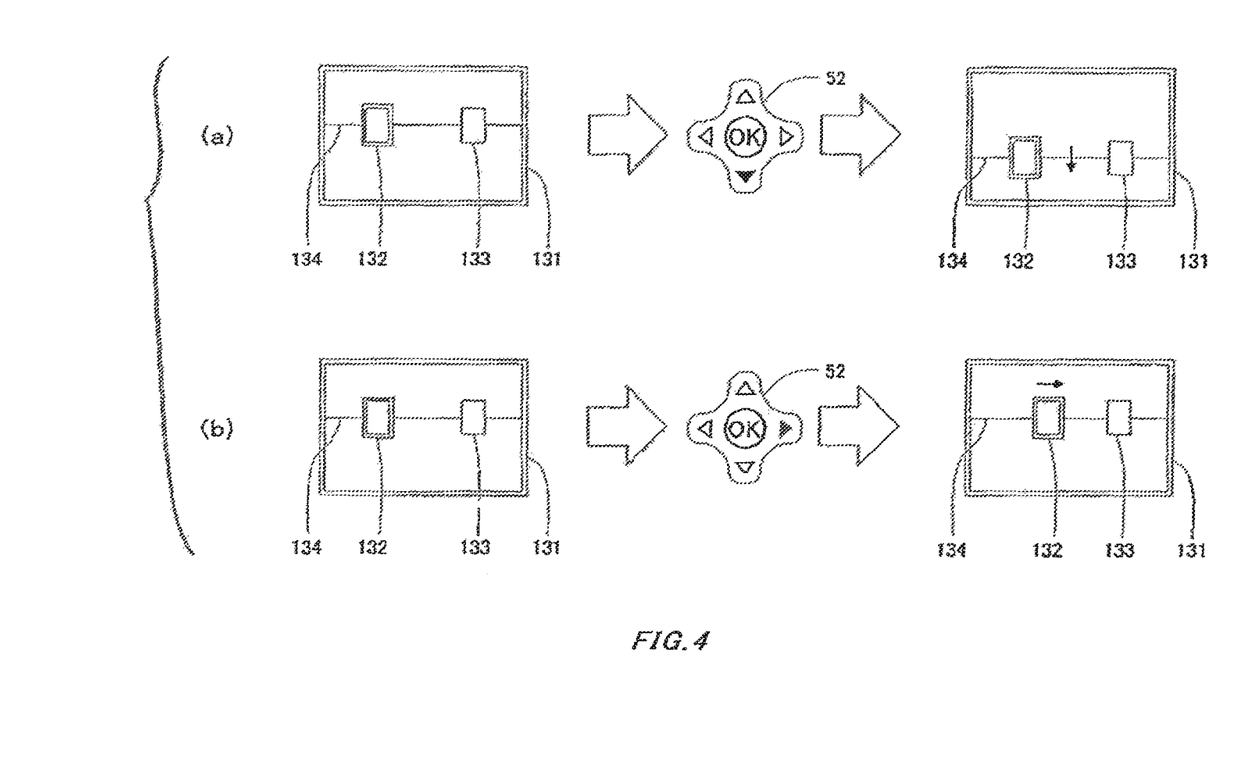
FIG. 4 is a view illustrating movement of an active window and an inactive window.

FIG. 4 is a view illustrating the movement of each zoom-in area of the active window 111 and the inactive window 121. The display positions of the active window 111 and the inactive window 121 are fixed to the display unit 37, and the navigation window 131 indicates which area with respect to the entire angle of view is shown by each zoom-in area. Therefore, the situation of change in the navigation window 131 will be described sequentially. In particular, a case where the zoom-in areas are set as mutually horizontal areas will now be described.

If the user operates a lower direction of the cross key 52 in an leftmost initial state (a) in FIG. 4, the entire parts of the active indicator 132, the inactive indicator 133, and the horizontal line 134 move in a lower direction according to the amount of user operation as illustrated in a rightmost state (a) in FIG. 4. That is, the display control unit 36 moves downward the zoom-in area displayed on the active window 111, and also moves downward the zoom-in area displayed on the inactive window 121 in synchronization with the zoom-in area displayed on the active window 111. Similarly, in a case where the user operates an upper direction of the cross key 52, the entire parts of the active indicator 132, the inactive indicator 133, and the horizontal line 134 move in an upper direction according to the amount of user operation. That is, the display control unit 36 moves upward the zoom-in area displayed on the active window 111, and also moves upward the zoom-in area displayed on the inactive window 121 in synchronization with the zoom-in area displayed on the active window 111.

If the user operates a right direction of the cross key 52 in a leftmost initial state (b) in FIG. 4, only the active indicator 132 moves in a right direction according to the amount of user operation as illustrated in a rightmost state (b) in FIG. 4. That is, the display control unit 36 moves rightward only the zoom-in area displayed on the active window 111, and does not move the zoom-in area displayed on the inactive window 121. Similarly, in a case where the user operates a left direction of the cross key 52, only the active indicator 132 moves in a left direction according to the amount of user operation. That is, the display control unit 36 moves leftward only the zoom-in area displayed on the active window 111, and does not move the zoom-in area displayed on the inactive window 121.

Figure 5:
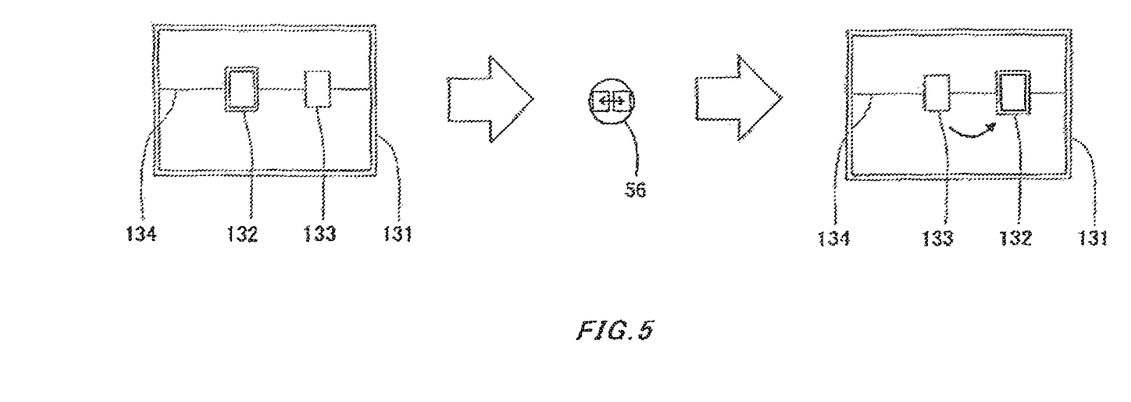
FIG. 5 is a view illustrating switching of the active window.

FIG. 5 is a view illustrating switching of the active window 111. If the user operates the active window switch button 56 in a leftmost initial state of the drawing, the active indicator 132 shifts to the original position of the inactive indicator 133, and the inactive indicator 133 shifts to the original position of the active indicator 132 as illustrated in a rightmost state of the drawing. That is, the positions of the active indicator 132 and the inactive indicator 133 replace each other. In this case, the display control unit 36 also replaces the positional relationship between the active window 111 and the inactive window 121 illustrated in FIG. 3. That is, out of two zoom-in windows, the zoom-in window on the left side is taken as the inactive window 121, and the zoom-in window on the right side is taken as the active window 111.

Figure 6:
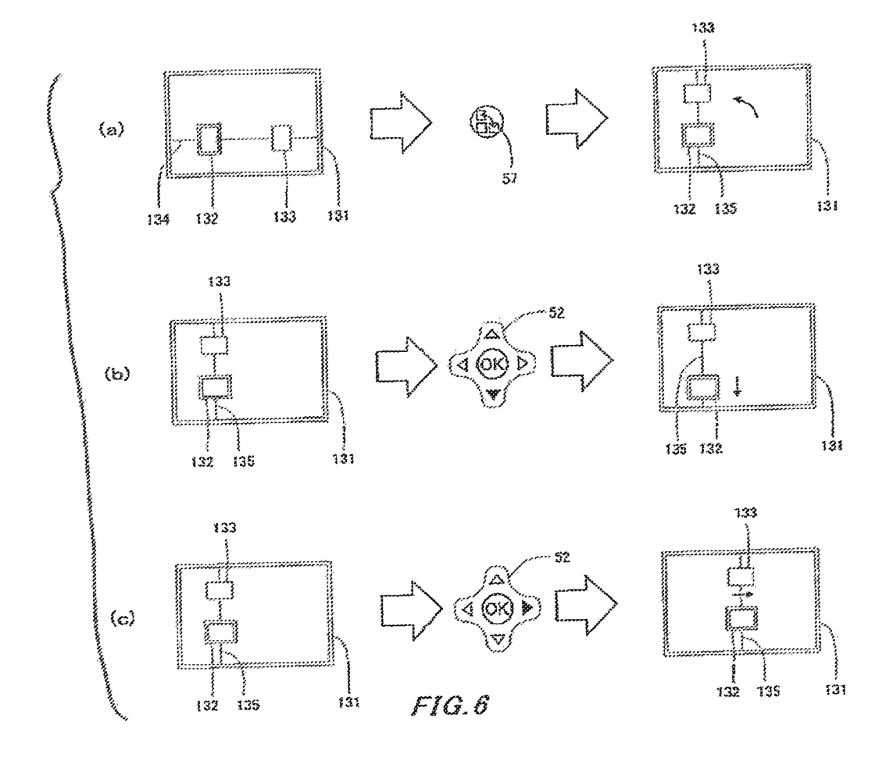
FIG. 6 is a view illustrating switching of window arrangement.

FIG. 6 is a view illustrating switching of the window arrangement. If the user operates the window arrangement switch button 57 in a leftmost state (a) in FIG. 6, the inactive indicator 133 is rotated 90 degrees counterclockwise based on the center of the active indicator 132 as illustrated in a rightmost state (a) in FIG. 6. A gap between the active indicator 132 and the inactive indicator 133 is appropriately adjusted according to the rotation. When the inactive indicator 133 is rotated 90 degrees, the relative positional relationship between each of the indicator changes from the horizontal direction to the vertical direction, and thus, a vertical line 135 is displayed instead of the horizontal line 134. The vertical line 135 is a line passing through the center of each indicator.

Also, as the relative positional relationship changes to the vertical direction, the shape of each indicator also changes from a portrait shape to a landscape shape. That is, the display control unit 36 makes the shapes of the active window 111 and the inactive window 121 illustrated in FIG. 3 into a landscape shape. Moreover, the active window 111 and the inactive window 121 are arranged next to each other downward and upward, respectively, corresponding to the relative positional relationship between both of the indicators. Also, the display control unit 36 changes the main line 112 from the horizontal direction to the vertical direction, and changes the subline 113 from the vertical direction to the horizontal direction. By such change of a display aspect to the vertical direction, it becomes easier for the user to exactly match the vertical line of the construction with the vertical direction of the photographed image, for example.

If the user operates the lower direction of the cross key 52 in a leftmost state (b) in FIG. 6 where the indicators of (a) in FIG. 6 are rotated 90 degrees, only the active indicator 132 moves in the lower direction according to the amount of user operation as illustrated in a rightmost state (b) in FIG. 6. That is, the display control unit 36 moves downward only the zoom-in area displayed on the active window 111, and does not move the zoom-in area displayed on the inactive window 121. Similarly, in a case where the user operates the upper direction of the cross key 52, only the active indicator 132 moves in the upper direction according to the amount of user operation. That is, the display control unit 36 moves upward only the zoom-in area displayed on the active window 111, and does not move the zoom-in area displayed on the inactive window 121.

If the user operates the right direction of the cross key 52 in a leftmost state (c) in FIG. 6 where the indicators of (a)

in FIG. 6 are rotated 90 degrees, the entire parts of the active indicator 132, the inactive indicator 133, and the vertical line 135 move in the right direction according to the amount of user operation as illustrated in a rightmost state (c) in FIG. 6. That is, the display control unit 36 moves rightward the zoom-in area displayed on the active window 111, and also moves rightward the zoom-in area displayed on the inactive window 121 in synchronization with the zoom-in area displayed on the active window 111. Similarly, in a case where the user operates the left direction of the cross key 52, the entire parts of the active indicator 132, the inactive indicator 133, and the vertical line 135 move in the left direction according to the amount of user operation. That is, the display control unit 36 moves leftward the zoom-in area displayed on the active window 111, and also moves leftward the zoom-in area displayed on the inactive window 121 in synchronization with the zoom-in area displayed on the active window 111.

Therefore, by combining the operations described with reference to FIG. 4 to FIG. 6, the zoom-in areas can be set in any positions within the angle of view, and the relative positional relationship between two zoom-in areas can also be selected from the horizontal direction and the vertical direction. Also, by operating the zoom-in button 54 and the zoom-out button 55 in combination, visibility of the zoom-in window can be further enhanced. In addition, in a case where the zoom-in button 54 is operated, a proportion of the zoom-in area for a whole area of the angle of view becomes smaller, and thus, the active indicator 132 and the inactive indicator 133 are zoomed out to be displayed. Similarly, in a case where the zoom-out button 55 is operated, the proportion of the zoom-in area for a whole area of the angle of view becomes larger, and thus, the active indicator 132 and the inactive indicator 133 are zoomed in to be displayed.

Figure 7:
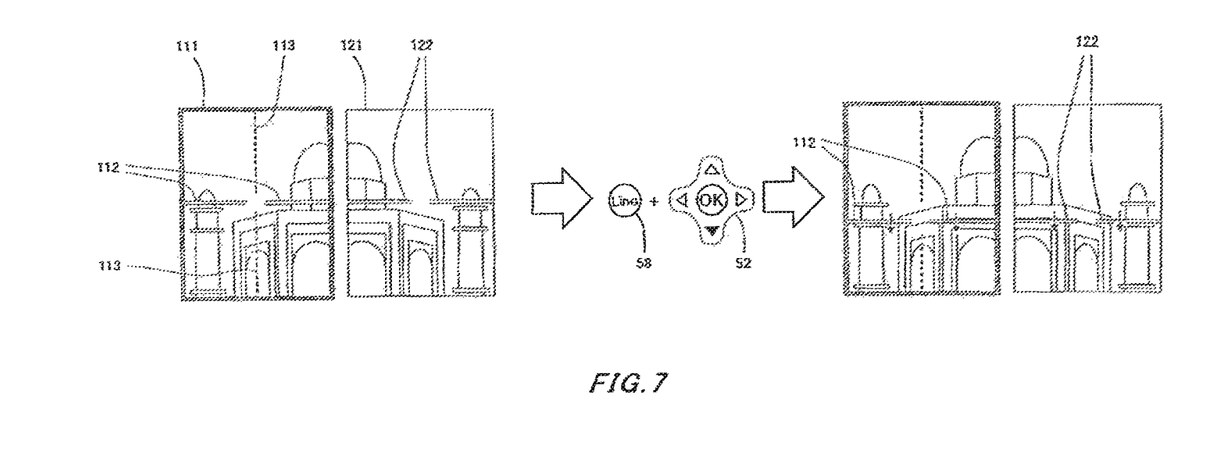
FIG. 7 is a view illustrating movement of display lines.

FIG. 7 is a view illustrating the movement of the display lines. In a leftmost initial state in FIG. 7 which is also illustrated in FIG. 3, if the user operates the line movement selection button 58 and operates the lower direction of the cross key 52, the main line 112 and the main line 122 move in the lower direction in synchronization with each other according to the amount of user operation as illustrated in a rightmost state in FIG. 7. In this case, the subline 113 moves such that the cut-out position follows the movement of the main line 112. By allowing the movement of the display lines in this way, the user can confirm the degree of matching between the main line 112 and the horizontal line of the construction, for example, by overlapping them. Therefore, it is possible to match the horizontal direction of the photographed image and the horizontal line of the construction more exactly. Also, by cutting out near the center of each main line, each main line would not disturb in a case where the horizontal line of the construction is confirmed.

Figure 8:
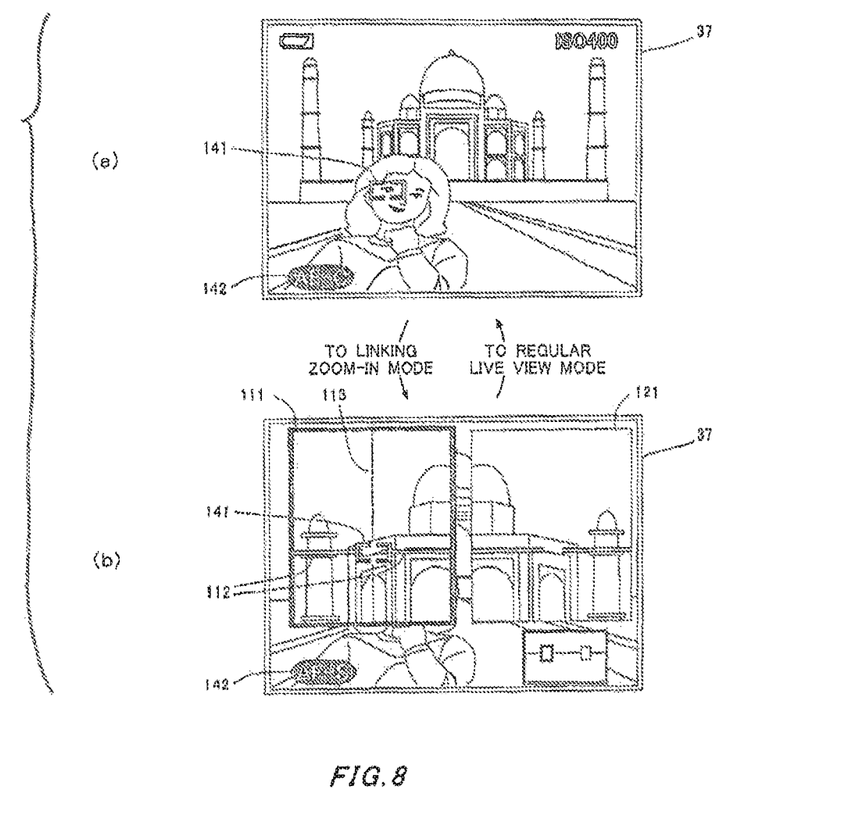
FIG. 8 is a view illustrating switching of an AF operation between modes.

Next, switching between an auto focus (AF) operation in the regular live view mode and an AF operation in the linking zoom-in mode will be described. FIG. 8 is a view illustrating switching of the AF operations between both of the modes.

The user can select various AF modes prepared by the camera 10. For example, the user may select a single AF mode (AF-S) that performs focus adjustment once in a selected focus adjustment area 141 by the operation of SW1 of the release switch 40, and then performs focus lock when the selected area is brought into focus. Also, the user may select a continuous AF mode (AF-C) caused to continue performing focus adjustment following the movement of the object in the selected focus adjustment area 141 by continuing the state of SW1. A state (a) in FIG. 8 indicates a situation where the focus adjustment area 141 is set so as to follow the operation of the person of the object in the regular live view mode, and where the AF-C mode is selected. An AF mode icon 142 indicative of the AF mode being selected is displayed on the lower left-hand side of the display unit 37.

The display control unit 36 superimposes the active window 111 as illustrated in FIG. 3, upon accepting instructions to shift from the state (a) in FIG. 8 to the linking zoom-in mode. Moreover, the system control unit 11 defines the vicinity of the intersection of the main line 112 and the subline 113 as the focus adjustment area 141 upon receiving the operation of SW1 by the user, and then performs the focus adjustment for the object in the area.

In this way, even in a case where the main object is not a construction which is desirably subjected to horizontal leveling, for example, by temporarily changing the focus adjustment area 141 to the construction in the linking zoom-in mode, the user can perform the horizontal leveling while visually recognizing the construction in focus. Also, in the linking zoom-in mode, regardless of the AF mode which has ever been set, it is switched to the AF-S mode. By uniformly switching to the AF-S mode, it is possible to prevent the focus state from unintentionally varying during the operation of the horizontal leveling.

When the linking zoom-in mode is released and is returned to the regular live view mode, the system control unit 11 returns the setting to the focus adjustment area 141 before shifting to the linking zoom-in mode and the AF mode. By automatically returning the setting in this way, the user can follow the AF mode setting the main object more quickly.

Figure 9:
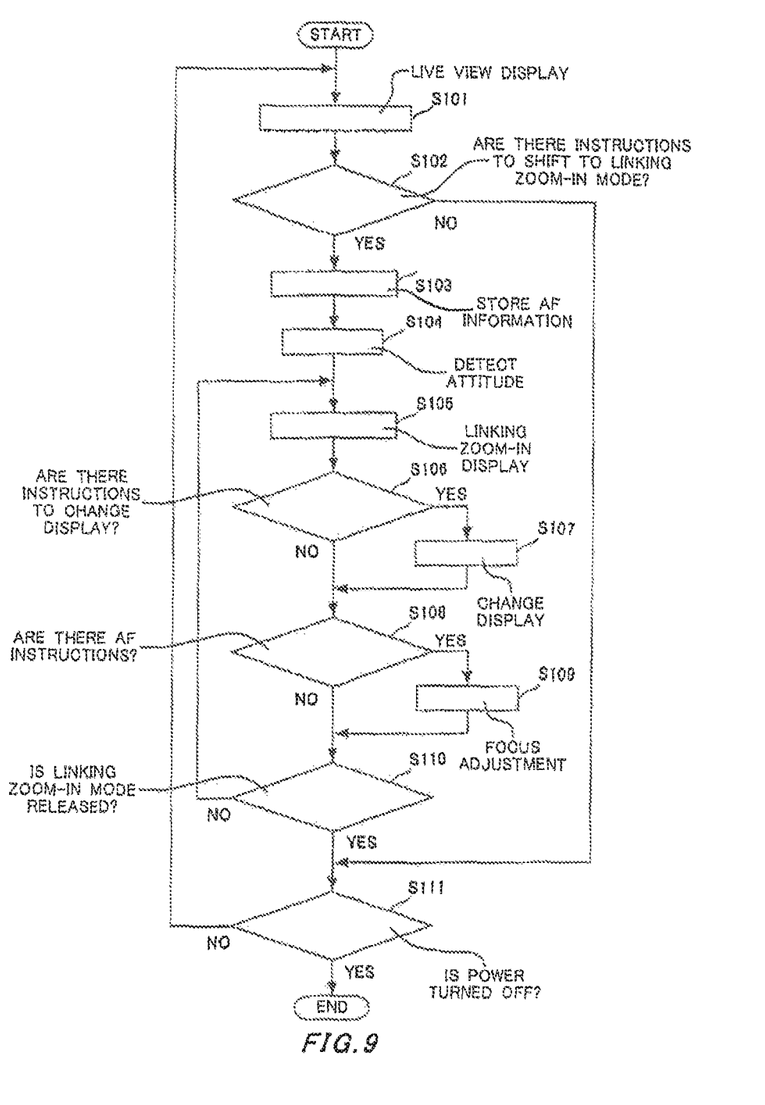
FIG. 9 is a flow diagram representing a series of processing of the linking zoom-in mode.

Next, a processing flow in the linking zoom-in mode will be described. FIG. 9 is a flow diagram representing a series of processing in the linking zoom-in mode. The flow starts at a point in time when the power source is turned ON by the shooting mode.

When the shooting mode starts, the system control unit 11 performs live view display at step S101. The system control unit 11 performs focus adjustment by the set AF mode if SW1 is sensed while the live view display is performed, and performs the operation of acquiring the object image by the imaging element 31 if SW2 is sensed. The operation of acquiring the object may be a still image acquisition operation or a moving image acquisition operation.

At the time of the live view display, the system control unit 11 regularly determines whether or not instructions to shift to the linking zoom-in mode as described with reference to FIG. 2 are accepted (step S102). If it is determined that the instructions are not accepted, the flow proceeds to step S111. If it is determined that the instructions are accepted, the flow proceeds to step S103.

At step S103, the system control unit 11 stores in the internal memory 34 the positional information of the focus adjustment area set in the live view mode and the selected AF mode as AF information. Then, the flow proceeds to step S104, and the system control unit 11 obtains an output of the attitude sensor 41 to detect the attitude of the camera 10. If the detected attitude is a horizontal angle of view, two zoom-in areas are set in the horizontal direction along the longitudinal direction of the imaging element 31 as an initial state as illustrated in FIG. 3. If the detected attitude is a vertical angle of view, two zoom-in areas are set in the horizontal direction along the lateral direction of the imaging element 31 as an initial state. Then, the flow proceeds to step S105 to perform linking zoom-in display.

During the linking zoom-in display, the system control unit 11 regularly determines whether or not instructions to change the display as described with reference to FIG. 4 to FIG. 7 are accepted (step S106). If it is determined that the instructions are accepted, the flow proceeds to step S107 to change the display in accordance with the received instructions, and then proceeds to step S108. If it is determined that the instructions are not accepted, the flow skips step S107, and then proceeds to step S108.

The system control unit 11 determines whether or not instructions to perform the AF operation by SW1 are accepted at step S108. If it is determined that the instructions are accepted, the flow proceeds to step S109 to perform focus adjustment. At this time, the system control unit 11 moves the focus adjustment area 141 to an area of the active window 111, switches the AF mode to the AF-S mode, and performs the focus adjustment via the lens control unit 42 as described with reference to FIG. 8. Then, the flow proceeds to step S110. If it is determined that the instructions are not accepted, the flow skips step S109, and then proceeds to step S110.

The system control unit 11 determines whether or not the linking zoom-in mode is released at step S110. If it is determined that the linking zoom-in display mode is not released, the flow returns to step S105 to continue the linking zoom-in display. If it is determined that the linking zoom-in mode is released, the flow proceeds to step S111.

The system control unit 11 determines whether or not the power source is turned OFF at step S111. If it is determined that the power source is not turned OFF, the flow returns to step S101 to perform the live view display. If it is determined that the power source is turned OFF, a series of processing ends. In addition, the determination of whether or not the power source is turned OFF may be added during the linking zoom-in display.

The present embodiment described above showed an aspect of providing one active window 111 and one inactive window 121 as zoom-in windows. However, the number of the inactive windows 121 may be increased to two or more. For example, it is possible to provide one inactive window 121 in the horizontal direction with respect to the active window 111, and also provide another inactive window 121 in the vertical direction with respect to the active window 111.

Also, the arrangement of each zoom-in area of the active window 111 and the inactive window 121 may not be limited to the horizontal direction and the vertical direction. The arrangement in a direction of 45 degrees may be allowed, and further, each zoom-in area may be designed so as to be able to be independently and freely arranged. Either way, the arrangement is not limited as long as the positional information representing the positional relationship between the zoom-in areas is superimposed and displayed on at least any one of the zoom-in windows. For example, in a case where the zoom-in area can be independently moved, the horizontal main line 112 is displayed on the active window 111, and in a case where the horizontal line represented by the main line 112 and the zoom-in area displayed by the inactive window 121 overlap, the main line 122 is also displayed on the inactive window 121.

Also, the display aspect of the positional information representing the positional relationship between the zoom-in areas is not limited to the lines. An aspect of indicating coordinates by numerical values other than a graphical image may also be employed.

Also, in a case where a shooting lens to be mounted is a special lens allowing shift shooting and tilt shooting, the system control unit 11 may acquire information of a shift direction and a tilt direction of an operated lens to set an initial position of a zoom-in area. By performing control in this way, it is possible to perform the linking zoom-in display reflecting the will of the user.

In addition, in a case where a periodic image such as a window of a building and the like is displayed on the zoom-in window, it may be difficult to find the deviation of the image due to the inclination. However, by displaying the main line 112, 122, and the subline 113, the user can recognize the inclination based on the display of these lines, and it is possible to easily perform the horizontal leveling even on the periodic image.

Although the camera 10 has been described as an example in the embodiments described above, examples of the imaging apparatus are not limited thereto. A tablet terminal, a smartphone, a game equipment, and the like provided with a camera unit therein may also employ the above-described embodiments.

In the imaging apparatus or the control program of the imaging apparatus in the embodiment described above, at least a part of the features is expressed by items as described below.

An imaging apparatus is provided with a display unit that displays a live view image, an accepting unit that accepts zoom-in instructions that zoom in the live view image, and a display control unit that generates a plurality of zoom-in windows in which each of a plurality of areas in the live view image is zoomed in based on the zoom-in instructions, and also superimposes on at least any one of the plurality of the zoom-in windows positional information representing a positional relationship among each of the zoom-in areas displayed on the plurality of the zoom-in windows to display them on the display unit.

In the imaging apparatus, the accepting unit accepts movement instructions that move the zoom-in area displayed on an active window which is one of the plurality of the zoom-in windows, and the display control unit moves the zoom-in area of an inactive window other than the active window in synchronization with the movement of the zoom-in area of the active window based on the relationship between a movement direction of the zoom-in area of the active window and the superimposed positional information.

In the imaging apparatus, the display control unit selectively superimposes as the positional information a first line and a second line which are parallel to a longitudinal direction of the live view image a lateral direction of the live view image, respectively.

In the imaging apparatus, in a case where the first line is superimposed, the display control unit does not move the inactive window when the accepting unit accepts the movement instructions that move the zoom-in area of the active window in the longitudinal direction and moves the inactive window in the lateral direction in synchronization with the active window when the accepting unit accepts the movement instructions that move the zoom-in area of the active window in the lateral direction, and in a case where the second line is superimposed, the display control unit does not move the inactive window when the accepting unit accepts the movement instructions that move the zoom-in area of the active window in the lateral direction and moves the inactive window in the longitudinal direction in synchronization with the active-window when the accepting unit accepts the movement instructions that move the zoom-in area of the active window in the longitudinal direction.

In the imaging apparatus, the accepting unit accepts displacement instructions that displace the first line and the second line which are superimposed and displayed within the plurality of the zoom-in windows.

In the imaging apparatus, a center area of the zoom-in area does not display the first line and the second line. In the imaging apparatus, the accepting unit accepts switching instructions that switch between lines such that one of the first line and the second line is superimposed on the other one, and the display control unit changes the zoom-in area of the inactive window with respect to the zoom-in area of the active window from one of the longitudinal direction and the lateral direction to the other one in synchronization with the switching instructions.

In the imaging apparatus, the display control units selectively superimposes the first line and the second line based on the displacement of an optical axis in a case where an imaging lens that displaces the optical axis with respect to the imaging element is mounted.

The imaging apparatus is provided with a focus adjustment unit that adjusts focus, the focus adjustment unit performing focus adjustment in the zoom-in area of the active window.

The imaging apparatus is provided with a storage unit that stores a focus adjustment area before the display control unit displays the plurality of the zoom-in windows, and the focus adjustment unit performs focus adjustment in the focus adjustment area stored in the storage unit when the display of the plurality of the zoom-in windows is released.

In the imaging apparatus, the focus adjustment unit performs focus lock that stops focus adjustment after focusing regardless of setting before the display control unit displays the plurality of the zoom-in windows in a case where the focus adjustment unit performs focus adjustment in the zoom-in area of the active window.

A control program of the imaging apparatus causes a computer to perform a first display step of displaying a live view image, an accepting step of accepting zoom-in instructions that zoom in the live view image, and a second display step of generating a plurality of zoom-in windows in which each of a plurality of areas of the live view image is zoomed in based on the zoom-in instructions, and also superimposing and displaying on at least any one of the plurality of the zoom-in windows positional information representing a positional relationship among each of the zoom-in areas displayed on the plurality of the zoom-in windows.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

DESCRIPTION OF REFERENCE NUMERALS

10: camera,
11: system control unit,
12: system memory,
20: optical system,
21: lens group,
22: aperture,
31: imaging element,
32: A/D converter,
33: memory control unit,
34: internal memory,
35: image processing unit,
36: display control unit,
37: display unit,
38: recording medium IF,
39: operation member,
40: release switch,
41: attitude sensor,
42: lens control unit,
43: exposure control unit,
50: recording medium,
51: menu button,
52: cross key,
53: confirmation button,
54: zoom-in button,
55: zoom-out button,
56: active window switch button,
57: window arrangement switch button,
58: line movement selection button,
101: regular zoom-in mode icon,
102: linking zoom-in mode icon,
111: active window,
112: main line,
113: subline,
121: inactive window,
122: main line,
131: navigation window,
132: active indicator,
133: inactive indicator,
134: horizontal line,
135: vertical line,
141: focus adjustment area,
142: AF mode icon

What is claimed is:

1. An image display device comprising:
a display that displays a first image; and
a processor that sets a position of a first partial area of the first image, and sets a position of a second partial area of the first image based on the position of the first partial area, wherein
the display displays a first zoom-in image of the first partial area, a second zoom-in image of the second partial area, and a second image representing positions of the first and second partial areas within the first image.

2. The image display device according to claim 1, wherein the second image is an image that includes a first graphic indicative of the position of the first partial area and a second graphic indicative of the position of the second partial area in the first image.

3. The image display device according to claim 2, wherein the first and second graphics are arranged side by side in a horizontal direction or a vertical direction.

4. The image display device according to claim 3, wherein the processor moves the first graphic.

5. The image display device according to claim 4, wherein the processor moves the positions of the first and second partial areas in the first image in synchronization with movement of the first graphic.

6. The image display device according to claim 2, wherein at least one of the first zoom-in image of the first partial area and the second zoom-in image of the second partial area is superimposed and displayed on the first image.

7. The image display device according to claim 3, wherein the second graphic moves integrally with the first graphic.

8. The image display device according to claim 1, wherein a line connecting the first and second partial areas is positioned in parallel with a side of the first image having a rectangular shape.

9. The image display device according to claim 1, wherein the first and second partial areas are positioned side by side at an equal distance from a side of the first image having a rectangular shape.

10. The image display device according to claim 1, wherein
the display displays a line representing a first direction in the first zoom-in image of the first partial area and the second zoom-in image of the second partial area.

11. The image display device according to claim 1, wherein
the processor sets a position for focus adjustment to adjust a focus in the first image, and
when zooming in and displaying the first and second zoom-in images on the display, the processor sets the position for focus adjustment to adjust the focus for an object included in the first and second zoom-in images.

12. The image display device according to claim 1, wherein
the processor sets the second partial area to a position parallel to the first partial area relative to a horizontal or vertical direction.

13. A non-transitory recording medium storing a program that causes a computer to:
display a first image on a display;
set a position of a first partial area of the first image, and set a position of a second partial area of the first image based on the position of the first partial area; and
display a first zoom-in image of the first partial area, a second zoom-in image of the second partial area, and a second image representing positions of the first and second partial areas within the first image.

* * * * *